United States Patent
Furuyama

(10) Patent No.: US 8,252,083 B2
(45) Date of Patent: Aug. 28, 2012

(54) FILTER-HOLDING OBJECT

(75) Inventor: Satoru Furuyama, Osaka (JP)

(73) Assignee: Nitto Denko Corporation, Osaka (JP)

( * ) Notice: Subject to any disclaimer, the term of this patent is extended or adjusted under 35 U.S.C. 154(b) by 176 days.

(21) Appl. No.: 12/989,002

(22) PCT Filed: Mar. 5, 2010

(86) PCT No.: PCT/JP2010/053616
§ 371 (c)(1),
(2), (4) Date: Oct. 21, 2010

(87) PCT Pub. No.: WO2010/140402
PCT Pub. Date: Dec. 9, 2010

(65) Prior Publication Data
US 2011/0168022 A1    Jul. 14, 2011

(30) Foreign Application Priority Data

Jun. 4, 2009 (JP) ................................. 2009-134764

(51) Int. Cl.
*B01D 46/00* (2006.01)
(52) U.S. Cl. ............. 55/529; 55/385.1; 55/400; 55/482; 55/490; 224/901
(58) Field of Classification Search .................. 55/385.1, 55/400, 482, 490, 529; 224/901
See application file for complete search history.

(56) References Cited

U.S. PATENT DOCUMENTS

| | | | | |
|---|---|---|---|---|
| 2,079,297 A | * | 5/1937 | Manning | 55/488 |
| 3,727,769 A | * | 4/1973 | Scholl | 210/484 |
| 4,225,328 A | * | 9/1980 | Stiehl | 55/378 |
| 4,640,779 A | * | 2/1987 | Taki et al. | 210/493.5 |
| 7,771,517 B2 | * | 8/2010 | Dralle | 95/273 |
| 8,128,724 B2 | * | 3/2012 | Mills et al. | 55/529 |
| 2009/0061206 A1 | | 3/2009 | Saitou et al. | |

FOREIGN PATENT DOCUMENTS

| | | |
|---|---|---|
| JP | 62-58638 | 3/1987 |
| JP | 63-165271 | 7/1988 |
| JP | 2001-172577 | 6/2001 |
| JP | 2005-345875 | 12/2005 |
| JP | 2006-143299 | 6/2006 |
| JP | 2006-312308 | 11/2006 |
| JP | 2008-237949 | 10/2008 |

* cited by examiner

*Primary Examiner* — Jason M Greene
*Assistant Examiner* — Anthony Shumate
(74) *Attorney, Agent, or Firm* — Hamre, Schumann, Mueller & Larson, P.C.

(57) ABSTRACT

The present invention is intended to provide a filter-holding object that allows air permeable filters to be peeled from a carrier tape in a satisfactory manner without increasing a tension applied to the carrier tape.

A filter-holding object (1) includes: a carrier tape (2) extending in a specified direction; and a plurality of air permeable filters (3) held on the carrier tape (2) so as to be arranged in the specified direction. The air permeable filters (3) are shaped so that an end portion of each of the air permeable filters (3) on one side of the specified direction is sharpened toward the one side of the specified direction at an angle of 90 degrees or more. Preferably, the end portion of each of the air permeable filters (3) on the one side of the specified direction is sharpened at an angle of 135 degrees or less.

8 Claims, 5 Drawing Sheets

FILTER-HOLDING OBJECT

TECHNICAL FIELD

The present invention relates to a filter-holding object in which a plurality of air permeable filters are held on a carrier tape.

BACKGROUND ART

Conventionally, in automobile electrical components such as automobile ECUs (Electrical Control Units), motors, lamps and sensors, household electric tools such as electric toothbrushes, shavers and mobile phones, and solar cells, for example, a housing accommodating electronic parts, control boards, etc. has an opening to alleviate the pressure fluctuation in the housing and ventilate the inside of the housing, and the opening is closed with an air permeable filter. The air permeable filter ensures ventilation between the inside and the outside of the housing and prevents the entry of foreign substances into the housing.

For example, such an air permeable filter may be adhered directly to the housing as shown in FIG. 3 of Patent Literature 1, or may be adhered to a support body to be attached to the housing as shown in FIG. 5 of Patent Literature 1.

CITATION LIST

Patent Literature

PTL 1 JP 2008-237949 A

SUMMARY OF INVENTION

Technical Problem

In order to produce a large number of housings or support bodies with air permeable filters adhered thereto, it is conceivable to configure a system as shown in FIG. 5. More specifically, a filter-holding object 10 in which air permeable filters 30 are held on a carrier tape 20 is prepared, and the filter-holding object 10 is wound around a core body 51 to form a reel. The carrier tape 20 travels along a knife-edge-shaped peeling table 52, and then is taken up by a take-up roll 53. A tension roller 54 applies a proper tension to the carrier tape 20. When the take-up roll 53 is rotated, the filter-holding object 10 is pulled out from the reel and the air permeable filters 30 each are peeled from the carrier tape 20 at an end of the peeling table 52.

On the other hand, an opening body 7 that is the housing or the support body is placed on a mounting table 63. The air permeable filter 30 partly peeled from the carrier tape 20 is picked up by an adsorption nozzle 61, and then conveyed onto the opening body 7. Thereafter, the air permeable filter 30 is adhered to the opening body 7 by, for example, an ultrasonic welding machine 62.

In the system as shown in FIG. 5, however, where air permeable filters with low rigidity are used as the air permeable filters 30, it is hard to peel the air permeable filters 30 from the carrier tape 20, raising the possibility of pick-up errors occurring. Specifically, there occurs a phenomenon in which the air permeable filters 30 are turned back at the end of the peeling table 52 following the carrier tape 20. In order to prevent this phenomenon, it is conceivable to increase the tension applied to the carrier tape 20. However, an intricate system configuration is required to make such a tension control possible. Moreover, if the tension applied to the carrier tape 20 is increased excessively, the air permeable filters 30 held on the carrier tape 20 may be deformed.

In view of the foregoing, the present invention is intended to provide a filter-holding object that allows air permeable filters to be peeled from a carrier tape in a satisfactory manner without increasing the tension applied to the carrier tape.

Solution to Problem

In order to achieve the above-mentioned purpose, the present inventor has made intensive studies. As a result, the inventor has conceived that the above-mentioned problem can be solved by determining the shape of the air permeable filter appropriately. More specifically, the inventor has conceived that the fact that the conventional air permeable filter 30 has a circular shape as shown in FIG. 6 makes it hard to peel the air permeable filter 30. The present invention has been accomplished from this view point.

More specifically, the present invention provides a filter-holding object including: a carrier tape extending in a specified direction; and a plurality of air permeable filters held on the carrier tape so as to be arranged in the specified direction. The air permeable filters are shaped so that an end portion of each of the air permeable filters on one side of the specified direction is sharpened toward the one side of the specified direction at an angle of 90 degrees or more.

Advantageous Effects of Invention

In the above-mentioned configuration, since the end portion of each of the air permeable filters is sharpened toward one side of a longitudinal direction of the carrier tape, the holding strength of the carrier tape for holding the air permeable filters reduces toward a tip of the end portion. Therefore, by allowing the carrier tape to travel along a peeling table so that the direction in which the holding strength reduces coincides with the traveling direction, it is possible to peel the air permeable filters from the carrier tape in a satisfactory manner without increasing the tension applied to the carrier tape.

DESCRIPTION OF EMBODIMENTS

Hereinafter, embodiments of the present invention will be described with reference to the accompanying drawings. Since the production system shown in FIG. 5 described in Technical Problem is used suitably for the filter-holding object of the present invention, the filter-holding object will be described with reference to FIG. 5 below.

Figure 5:
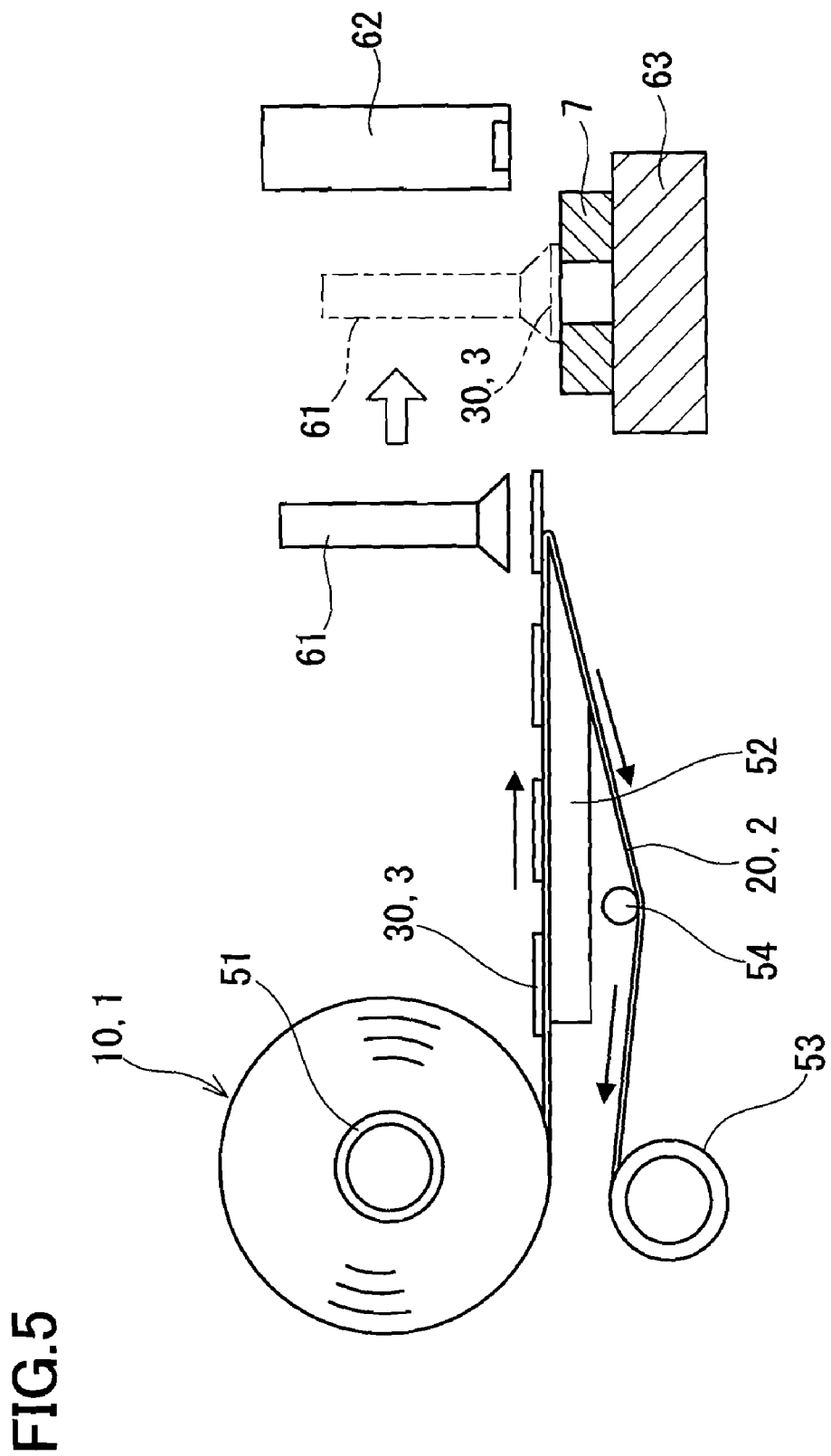
FIG. 5 is a schematic configuration diagram of a production system.
Figure 6:
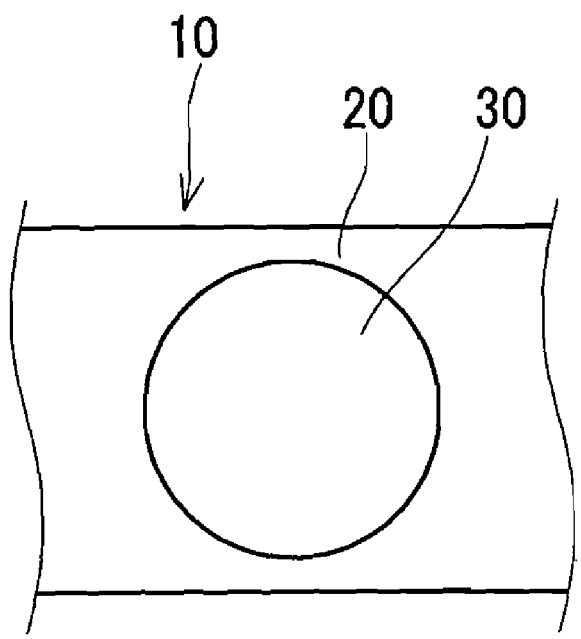
FIG. 6 is a plan view of a conventional filter-holding object.

As shown in FIG. 5, a filter-holding object 1 according to one embodiment of the present invention includes a carrier tape 2 extending in a specified direction, and a plurality of air permeable filters 3 held on the carrier tape 2. Hereinafter, in this description, for the convenience of explanation, the specified direction, that is, a longitudinal direction of the carrier tape 2 is referred to as an X direction. Particularly, one side of the X direction (the side of the traveling direction of the carrier tape 2 in FIG. 5) is referred to as a +X direction, and the other side opposite to the +X direction is referred to as a −X direction.

As shown in FIG. 5, the filter-holding object 1 preferably is formed into a reel. In order to form such a reel, an end of the carrier tape 2 in the −X direction is fixed to the core body 51 and then the filter-holding object 1 is wound around the core body 51. More specifically, the +X direction is also a direction in which the filter-holding object 1 is pulled out from the reel.

The air permeable filters 3 are held on the carrier tape 2 so as to be arranged in the X direction. Preferably, the air permeable filters 3 are arranged straight in a row. Alternatively, the air permeable filters 3 may be arranged in a staggered manner, for example.

The carrier tape 2 has a relatively low adhesive strength on a surface on which the air permeable filters 3 are held. The carrier tape 2 holds the air permeable filters 3 with this adhesive strength.

As the carrier tape 2, there can be used a carrier tape obtained by applying an adhesive to a substrate. The substrate may be composed of, for example: a resin film made of polyester such as PET (polyethylene terephthalate) and polybutylene terephthalate, polyolefin such as polypropylene, polyethylene and polymethylpentene, and polycarbonate; paper such as fine paper, coated paper, impregnated paper and a synthetic paper; and a metal foil made of aluminum, stainless steel or the like. As the adhesive, an acrylic adhesive can be used, for example.

Preferably, the carrier tape 2 has a thickness of 0.01 mm to 0.1 mm, and more preferably 0.02 mm to 0.08 mm.

In the case where the carrier tape 2 holds the air permeable filters 3 by using a double-sided tape 4 as will be described later, the carrier tape 2 can be composed only of the substrate with no adhesive applied thereto.

The structure and the material of each of the air permeable filters 3 are not particularly limited as long as they allow air to permeate through the air permeable filters 3. As the air permeable filters 3, an air permeable filter including a resin porous membrane can be used suitably. As the resin porous membrane, there can be used a fluororesin porous membrane, a polyolefin porous membrane, etc. that can be produced by a known method such as a drawing method and an extraction method. Examples of the fluororesin include PTEF (polytetrafluoroethylene), polychlorotrifluoroethylene, a tetrafluoroethylene-hexafluoropropylene copolymer, a tetrafluoroethylene-perfluoroalkylvinylether copolymer, and a tetrafluoroethylene-ethylene copolymer. Examples of a monomer forming the polyolefin include ethylene, propylene, 4-methylpentene-1,1 butene. It is possible to use polyolefin obtained by simply polymerizing or copolymerizing these monomers. Alternatively, it is also possible to use, for example, a nanofiber film porous body using polyacrylonitrile, nylon, or polylactic acid. Among all, it is preferable to use a PTFE porous membrane that is capable of ensuring air permeability with a small area and furnished with a high function of inhibiting entry of water and dust into a housing. For example, it is possible to use a PTFE porous membrane having an air permeability of 0.1 to 500 sec/100 mL in Gurley value, a water pressure resistance of 1.0 kPa or more, and a thickness of 1 μm to 5 mm as a single body.

The resin porous membrane may be subject to a liquid-repellent treatment. The liquid-repellent treatment can be performed by applying a liquid-repellent agent to the resin porous membrane, drying, and then curing it. The liquid-repellent agent only needs to form a coating film with a lower surface tension than that of the resin porous membrane. For example, a liquid-repellent agent containing a polymer having a perfluoroalkyl group is used suitably. The liquid-repellent agent can be applied by soaking, spraying, etc.

An air-permeable supporting member may be stacked on one side or both sides of the resin porous membrane. Providing such an air-permeable supporting member allows the air permeable filter 3 to have a high strength. Preferably, the air-permeable supporting member has a higher air permeability than that of the resin porous membrane. Specifically, woven fabric, nonwoven fabric, a net, a mesh, etc. can be used as the air-permeable supporting member. Examples of the material of the air-permeable supporting member include polyester, polyethylene, and an aramid resin.

The resin porous membrane and the air-permeable supporting member are bonded to each other by a common method such as heat welding and bonding with a bonding agent. The resin porous membrane and the air-permeable supporting member are bonded to each other partially, and the area of the bonding portion preferably is 5% to 20% of the total area. This is because the resin porous membrane and the air-permeable supporting member tend to be separated from each other easily when the area of the boding portion is less than 5% of the total area, and the water pressure resistance decreases when the area of the boding portion exceeds 20% of the total area. Preferably, the boding portion is distributed uniformly over the total area.

Preferably, the air permeable filters 3 each have a thickness of 0.02 mm to 1 mm. The air permeable filters 3 with a thickness of less than 0.02 mm have no stiffness, and the workability at handling the air permeable filters 3 is deteriorated. The air permeable filters 3 with a thickness exceeding 1 mm make larger projections and depressions on the filter-holding object 1, making it difficult to form the filter-holding object 1 into a reel. A more preferable thickness of each of the air permeable filters 3 is 0.05 mm to 0.3 mm.

Each of the air permeable filters 3 is shaped so that an end portion thereof in the +X direction is sharpened in the +X direction. Preferably, the angle at which the end portion in the +X direction is sharpened is at least 90 degrees but not more than 135 degrees.

Figure 1A:
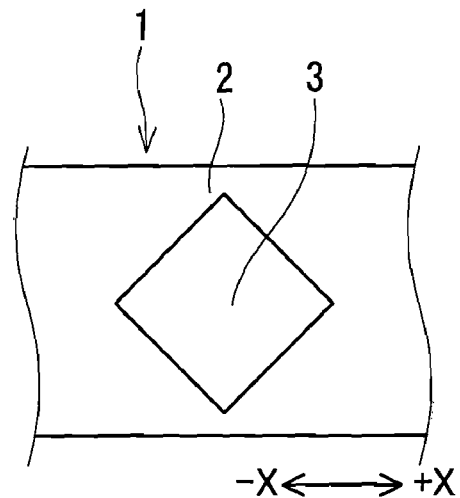
FIGS. 1A to 1C each are a plan view of a filter-holding object including a polygonal air permeable filter according to one embodiment of the present invention.
Figure 1B:
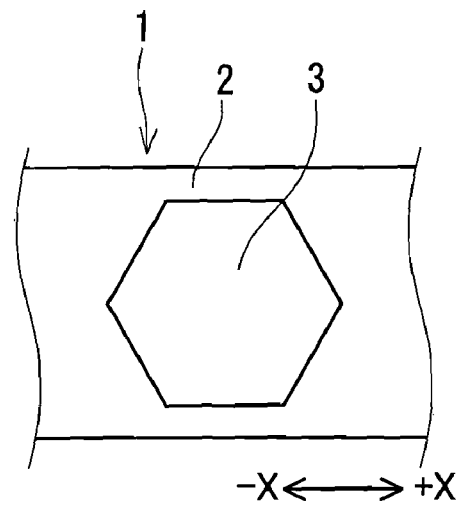
Figure 1C:
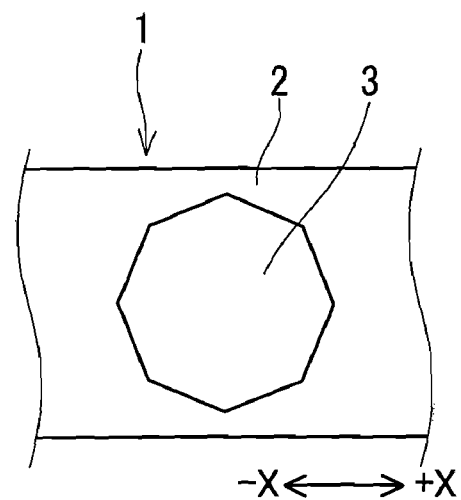

As shown in FIGS. 1A to 1C, each of the air permeable filters 3 may have a shape of a polygon, for example. The polygon may be a regular tetragon as shown in FIG. 1A, a regular pentagon, a regular hexagon as shown in FIG. 1B, a regular heptagon, or a regular octagon as shown in FIG. 1C. When the polygon is a regular polygon like these, the air permeable filters 3 may be held and oriented on the carrier tape 2 so that a direction from the center to one vertex of the regular polygon coincides with the +X direction. The polygon does not need to be a regular polygon with all its vertices being inscribed in a circle. For example, the polygon may be a home-base-shaped pentagon sharpened in the +X direction.

Figure 2A:
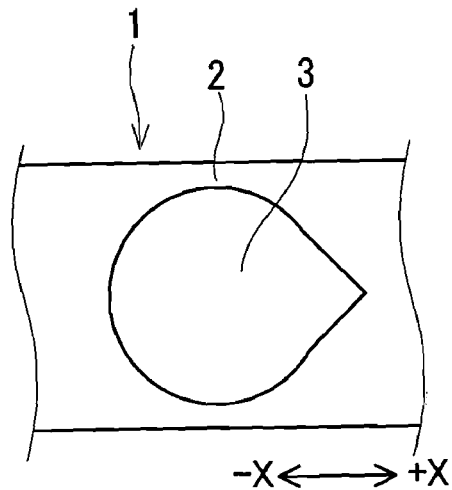
FIGS. 2A to 2C each are a plan view of a filter-holding object including a non-polygonal (water-drop-shaped) air permeable filter according to one embodiment of the present invention.
Figure 2B:
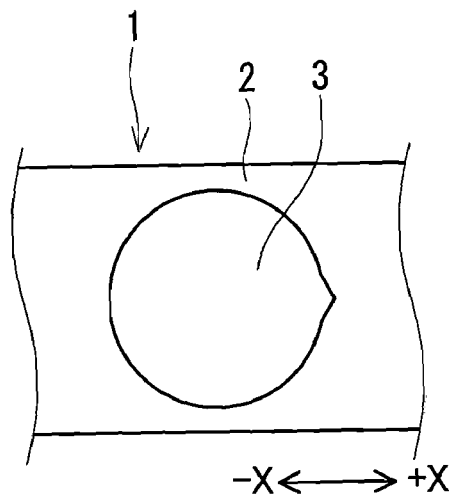
Figure 2C:
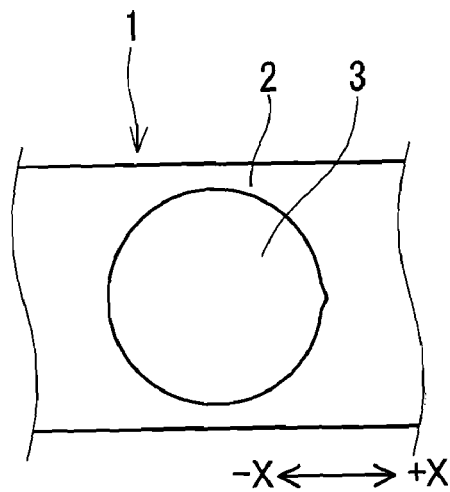

Alternatively, as shown in FIGS. 2A to 2C, each of the air permeable filters 3 may have a water drop shape in which a part of a circular portion is projected in the shape of an isosceles triangle. FIG. 2A shows a case in which the end portion of the air permeable filter 3 in the +X direction is sharpened at an angle of 90 degrees. FIG. 2B shows a case in which the angle is 120 degrees. FIG. 2C shows a case in which the angle is 135 degrees. When the air permeable filters 3 have a water drop shape like these, the air permeable filters 3 may be held and oriented on the carrier tape 2 so that a direction from the center of the circular portion to the vertex of the isosceles triangle coincides with the +X direction.

A tip of the end portion of each of the air permeable filters 3 sharpened in the +X direction may be roundish. This configuration makes it possible to reduce the contact area between the end portion of each of the air permeable filters 3 and the carrier tape 2, making it easy to pick up the air permeable filters 3. Thereby, the workability is also enhanced.

Figure 3A:
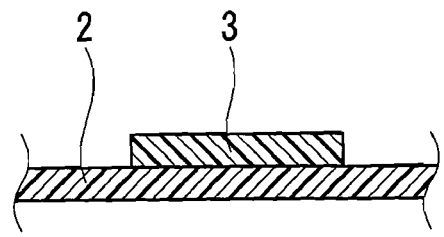
FIG. 3A is a cross-sectional view of a filter-holding object in which an air permeable filter is held directly on the carrier tape.

As shown in FIG. 3A, the air permeable filters 3 may be held directly on the carrier tape 2. In this case, as shown in FIG. 5, each of the air permeable filters 3 is picked up by the adsorption nozzle 61, conveyed onto the opening body 7, and then adhered to the opening body 7 by, for example, ultrasonic welding using the ultrasonic welding machine 62.

Figure 3B:
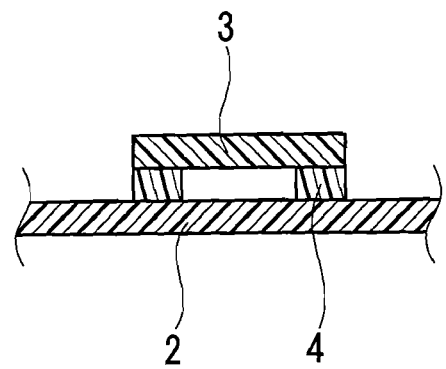
FIG. 3B is a cross-sectional view of a filter-holding object in which an air permeable filter is held on the carrier tape via a double-sided tape.

Alternatively, as shown in FIG. 3B, the air permeable filters 3 each may be held on the carrier tape 2 via the double-sided tape 4. Specifically, the annular double-sided tape 4 is adhered to a surface of each of the air permeable filters 3 facing the carrier tape 2, along a periphery of the surface. In this case, after being conveyed onto the opening body 7 by the adsorption nozzle 61, each of the air permeable filters 3 is adhered to the opening body 7 with the double-sided tape 4 by, for example, being pressed from the top.

The double-sided tape 4 is not particularly limited as long as it has adhesive strength on both sides. For example, it is possible to use a tape obtained by applying an acrylic or silicon adhesive to both sides of a support layer such as a PET substrate and nonwoven fabric.

Each of the air permeable filters 3 does not necessarily have to be adhered to the opening body 7. For example, each of the air permeable filters 3 may be attached to the opening body 7 by being integrally molded with a resin after being picked up by the adsorption nozzle 61.

As described above, since the end portion of each of the air permeable filters 3 is sharpened in the +X direction in the filter-holding object 1 of the present embodiment, the holding strength of the carrier tape 2 for holding the air permeable filters 3 reduces toward the tip of the end portion. Therefore, by allowing the carrier tape 2 to travel along the peeling table 52 (see FIG. 5) so that the +X direction coincides with the traveling direction, it is possible to peel the air permeable filters 3 from the carrier tape 2 in a satisfactory manner without increasing the tension applied to the carrier tape 2. The filter-holding object 1 thus configured is effective particularly in the case where the air permeable filters 3 each have a low rigidity (for example, in the case where the air permeable filters are PTFE porous membrane monolayers).

EXAMPLES

Hereinafter, the present invention will be described in detail with reference to examples, but the present invention is not restricted to these examples.

Examples

As a film for producing the air permeable filters, there was prepared Temish with a thickness of 0.2 mm, produced by Nitto Denko Corp. (a product produced by stacking PET nonwoven fabric on a PTFE porous membrane with a thickness of 0.08 mm). As the carrier tape, there was used a tape obtained by applying an acrylic adhesive to a substrate made of PET with a thickness of 0.08 mm.

The film was cut into regular polygons, each inscribed in a circle with a diameter of 10 mm, to produce air permeable filters. There were three types in the regular polygons; regular tetragon, regular hexagon and regular octagon. The air permeable filters of each type were held and oriented on the carrier tape so that a direction from the center to one vertex of the regular polygon coincides with a longitudinal direction of the carrier tape. Thus, filter-holding objects were obtained (Examples 1 to 3).

Filter-holding objects (Examples 4 to 6) were obtained in the same manner as in Examples 1 to 3, except for that: a substrate with no adhesive applied thereto was used as the carrier tape; and an annular double-sided tape is adhered to a surface of each of the air permeable filters facing the carrier tape, along a periphery of the surface.

Additionally, the above-mentioned film was cut into water drop shapes as shown in FIGS. 2A to 2C to produce air permeable filters. The water drop shapes each are a shape in which a part of a circular portion is projected in the shape of an isosceles triangle. There were four types in the angle of the vertex of the isosceles triangle; 90 degrees, 120 degrees, 135 degrees and 150 degrees. The air permeable filters of each type were held and oriented on the carrier tape so that a direction from the center of the circular portion to the vertex of the isosceles triangle coincides with the longitudinal direction of the carrier tape. Thus, filter-holding objects were obtained (Examples 7 to 10).

Filter-holding objects (Examples 11 to 14) were obtained in the same manner as in Examples 7 to 10, except for that: a substrate with no adhesive applied thereto was used as the carrier tape; and an annular double-sided tape is adhered to a surface of each of the air permeable filters facing the carrier tape, along a periphery of the surface.

Comparative Examples

The above-mentioned film was cut into circles with a diameter of 10 mm to produce air permeable filters. These air permeable filters were held on a carrier tape composed of a substrate with an adhesive applied thereto. Thus, a filter-holding object was obtained (Comparative Example 1).

A filter-holding object (Comparative Example 2) was obtained in the same manner as in Comparative Example 1, except for that: a substrate with no adhesive applied thereto was used as the carrier tape; and an annular double-sided tape is adhered to a surface of each of the air permeable filters facing the carrier tape, along a periphery of the surface.

A filter-holding object (Comparative Example 3) was obtained in the same manner as in Examples 7 to 10, except for that the angle of the vertex of the isosceles triangle in the water drop shape was 80 degrees.

A filter-holding object (Comparative Example 4) was obtained in the same manner as in Comparative Example 3, except for that: a substrate with no adhesive applied thereto was used as the carrier tape; and an annular double-sided tape is adhered to a surface of each of the air permeable filters facing the carrier tape, along a periphery of the surface.

(Peel Test)

Figure 4:
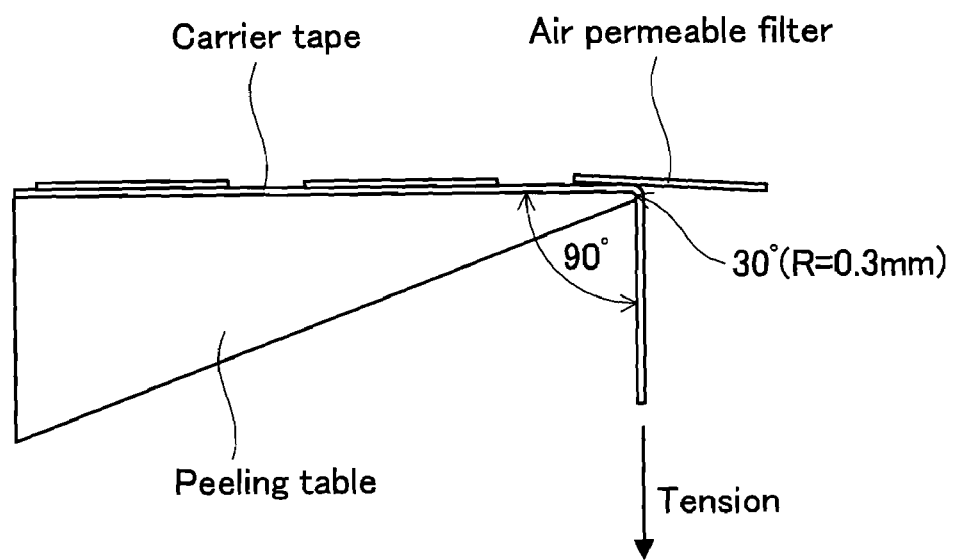
FIG. 4 is a diagram showing a method of a peel test.

The filter-holding objects of Examples 1 to 14 and Comparative Examples 1 to 4 were made to travel by being pulled 90 degrees vertically downward at a constant tension from the end of the peeling table as shown in FIG. 4 (the traveling direction coincided with the +X direction shown in FIG. 1 and FIG. 2.) The angle of the peeling table was 30 degrees, and the end of the peeling table was a curved surface with a radius of 0.3 mm. The travelling was performed at various tensions, and measurements were made to find the tension at which the air permeable filters were able to be peeled from the carrier tape. Table 1 and Table 2 show the results thereof.

TABLE 1

Holding air permeable filters by using an adhesive

|  | Shape of air permeable filters | Angle of end portion in traveling direction | Tension at which air permeable filters were able to be peeled (N) |
|---|---|---|---|
| Example 1 | Regular tetragon | 90 degrees | 0.735 |
| Example 2 | Regular hexagon | 120 degrees | 0.735 |
| Example 3 | Regular octagon | 135 degrees | 0.735 |
| Example 7 | Water drop shape | 90 degrees | 0.98 |
| Example 8 | " | 120 degrees | 0.735 |
| Example 9 | " | 135 degrees | 0.98 |
| Example 10 | " | 150 degrees | 1.47 |
| C. Example 1 | Circular | — | 1.96 |
| C. Example 3 | Water drop shape | 80 degrees | — |

TABLE 2

Holding air permeable filters by using a double-sided tape

|  | Shape of air permeable filters | Angle of end portion in traveling direction | Tension at which air permeable filters were able to be peeled (N) |
|---|---|---|---|
| Example 4 | Regular tetragon | 90 degrees | 0.735 |
| Example 5 | Regular hexagon | 120 degrees | 0.735 |
| Example 6 | Regular octagon | 135 degrees | 0.735 |
| Example 11 | Water drop shape | 90 degrees | 0.98 |
| Example 12 | " | 120 degrees | 0.735 |
| Example 13 | " | 135 degrees | 0.98 |
| Example 14 | " | 150 degrees | 1.47 |
| C. Example 2 | Circular | — | 1.715 |
| C. Example 4 | Water drop shape | 80 degrees | — |

As shown in Table 1, a tension of 1.96 N was required for the air permeable filters to be peeled in Comparative Example 1. In contrast, in Examples 1 to 3 and 7 to 10, the tension at which the air permeable filters were able to be peeled was suppressed to 1.47 N or less. Particularly, when the end portion of each of the air permeable filters in the traveling direction was sharpened at an angle of 135 degrees or less, the tension at which the air permeable filters were able to be peeled was suppressed to as low as 0.98 N or less. A similar tendency also appears in Table 2.

In Comparative Examples 3 and 4, in which the end portion of each of the air permeable filters in the traveling direction was sharpened at an angle less than 90 degrees, the air permeable filters failed to be peeled from the carrier tape and were turned back together with the carrier tape even when the tension applied to the carrier tape was increased to 1.96 N. Then each of the air permeable filters was flown off from the carrier tape after its center passed the end of the peeling table.

INDUSTRIAL APPLICABILITY

The air permeable filters included in the filter-holding object according to the present invention can be used for, for example, outdoor lamps such as outdoor light, and lamps of trains, other than automobile electrical components, household electric appliances and solar cells.

The invention claimed is:

1. A filter-holding object comprising:
a carrier tape extending in a specified direction; and
a plurality of air permeable filters held on the carrier tape so as to be arranged in the specified direction,
wherein the air permeable filters are shaped so that an end portion of each of the air permeable filters on one side of the specified direction is sharpened toward the one side of the specified direction at an angle of 90 degrees or more.

2. The filter-holding object according to claim 1, wherein the end portion of each of the air permeable filters on the one side of the specified direction is sharpened at an angle of 135 degrees or less.

3. The filter-holding object according to claim 1, wherein each of the air permeable filters has a shape of a polygon.

4. The filter-holding object according to claim 3, wherein the polygon is a regular tetragon, a regular pentagon, a regular hexagon, a regular heptagon, or a regular octagon.

5. The filter-holding object according to claim 1, wherein a tip of the end portion of each of the air permeable filters sharpened in the specified direction is roundish.

6. The filter-holding object according to claim 1, wherein each of the air permeable filters includes a resin porous membrane.

7. The filter-holding object according to claim 6, wherein each of the air permeable filters further includes an air-permeable supporting member stacked on the resin porous membrane.

8. The filter-holding object according to claim 1, wherein an annular double-sided tape is adhered to a surface of each of the air permeable filters facing the carrier tape, along a periphery of the surface.

* * * * *